United States Patent
Huang

(10) Patent No.: US 11,953,917 B1
(45) Date of Patent: Apr. 9, 2024

(54) GEOMAGNETISM-BASED LAUNCHING METHOD, LAUNCHING DEVICE AND DISPENSER

(71) Applicant: Shenzhen Siyufei Technology Co., Ltd., Shenzhen (CN)

(72) Inventor: Huanjing Huang, Wuhan (CN)

(73) Assignee: Shenzhen Siyufei Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/367,966

(22) Filed: Sep. 13, 2023

(30) Foreign Application Priority Data

Mar. 22, 2023 (CN) .......................... 202310281027.1

(51) Int. Cl.
  *G05D 1/00* (2006.01)
  *B64D 1/02* (2006.01)
  *B64U 101/00* (2023.01)

(52) U.S. Cl.
  CPC ............. *G05D 1/0808* (2013.01); *B64D 1/02* (2013.01); *B64U 2101/00* (2023.01); *B64U 2201/20* (2023.01)

(58) Field of Classification Search
  CPC .... G05D 1/0808; B64D 1/02; B64U 2101/00; B64U 2201/20
  See application file for complete search history.

(56) References Cited

U.S. PATENT DOCUMENTS

| | | | | |
|---|---|---|---|---|
| 9,074,848 B1 * | 7/2015 | Hunter, Jr. | ............... | G06G 7/80 |
| 2002/0008661 A1 * | 1/2002 | McCall | ................. | G01S 19/47 |
| | | | | 701/472 |
| 2015/0273693 A1 * | 10/2015 | Cohen | ................... | B25J 13/006 |
| | | | | 901/47 |
| 2017/0066135 A1 * | 3/2017 | Cohen | ..................... | H04L 67/12 |
| 2017/0349280 A1 * | 12/2017 | Liao | ..................... | G05D 1/0016 |
| 2018/0136647 A1 * | 5/2018 | Gurdan | ................. | B64D 47/02 |
| 2021/0216085 A1 * | 7/2021 | Wake | ..................... | G05D 1/106 |
| 2023/0280763 A1 * | 9/2023 | Lu | ......................... | B64C 39/024 |
| | | | | 701/7 |

FOREIGN PATENT DOCUMENTS

| | | |
|---|---|---|
| CN | 113514061 A | 10/2021 |
| CN | 115240436 A | 10/2022 |
| CN | 218038302 U | 12/2022 |

* cited by examiner

*Primary Examiner* — Donald J Wallace
(74) *Attorney, Agent, or Firm* — George D. Morgan

(57) ABSTRACT

The present application discloses a geomagnetism-based launching method, a launching device and a dispenser, and relates to the technical field of unmanned aerial vehicle (UAV). The launching method includes the following steps: obtaining the geomagnetic triaxial data at the current time according to a preset heartbeat time; calculating the corrected geomagnetic triaxial data according to the geomagnetic triaxial data at the current moment; calculating an angle value based on the corrected geomagnetic triaxial data, and storing the angle value in the pre-established system data set; the system data set is a set of angle values stored in an iterative coverage method with a fixed length; obtaining the updated system data set by using the Fourier transform algorithm to perform dithering operation on all angle values in the system data set, calculating the accumulated angle difference value of the updated system data set in a preset time period.

15 Claims, 4 Drawing Sheets

GEOMAGNETISM-BASED LAUNCHING METHOD, LAUNCHING DEVICE AND DISPENSER

CROSS-REFERENCE TO RELATED APPLICATIONS

The application claims priority to Chinese patent application No. 2023102810271, filed on Mar. 22, 2023, the entire contents of which are incorporated herein by reference.

TECHNICAL FIELD

The present application relates to the technical field of unmanned aerial vehicle (UAV), and in particular to a geomagnetism-based launching method, a launching device and a dispenser.

BACKGROUND

At present, unmanned aerial vehicles are widely used in many fields, and it is a common application in the field of unmanned aerial vehicles to deliver carried items, such as express delivery. The unmanned aerial vehicle (UAV) is controlled by the steering gear when dropping items, and the control of the steering gear needs to be achieved through the flight control platform of UAV. The main process for adopting this solution is: a signal is sent from the transmitter of the remote controller to the receiver, and the receiver transmits the remote control signal to the flight control platform. The flight control platform controls the motion of the servo through analytical calculation of output signals, thereby achieving launching control of loaded items.

This type of release control method requires setting the launching function on the remote control when the drone leaves the factory, or pairing the launching device with the corresponding remote control to form a system to complete the launching. This kind of technology is only suitable for newly designed UAVs or launchers, but it is not possible for some UAVs that have been produced and do not have automatic control and launching function.

In order to solve this problem, some new launching technologies have emerged. For example, by setting photosensitive components in the dispenser, the dispenser and the light-emitting lamp of the UAV are facing each other during assembly. By controlling the light of the UAV remote controller, when the light sensor senses that the light is on, the launching control can be realized.

This technology effectively solves the problem of existing UAVs not being able to be launched, as well as the need for a separate remote control to remotely launch the UAV. However, due to the fact that there is no lighting at the bottom of some UAVs, this kind of dispenser can not be used on the existing UAVs, which makes it inconvenient to launch UAVs. In addition, the accuracy of the existing dispenser is not high, which is not conducive to achieving accurate launching.

SUMMARY

A main object of the present application is to provide a geomagnetism-based launching method, aiming at solving the technical problems of weak launching applicability and low launching accuracy of the existing launching device.

In order to achieve the above object, a launching method based on geomagnetism is provided according to the present application, which is used for an unmanned aerial vehicle dispenser, the launching method includes the following steps:

obtaining the geomagnetic triaxial data at the current time according to a preset heartbeat time;

calculating the corrected geomagnetic triaxial data according to the geomagnetic triaxial data at the current moment;

calculating an angle value based on the corrected geomagnetic triaxial data, and storing the angle value in the pre-established system data set; the system data set is a set of angle values stored in an iterative coverage method with a fixed length;

obtaining the updated system data set by using the Fourier transform algorithm to perform dithering operation on all angle values in the system data set, calculating the accumulated angle difference value of the updated system data set in a preset time period, and controlling the unmanned aerial vehicle dispenser to execute the launching action when the angle difference value is greater than the preset angle value.

According to the launching method based on geomagnetism provided by the present application, it is only necessary to calculate the angle difference value according to the geomagnetic triaxial data, and then the launching device can be controlled, the operation method is simple and does not require changing the structure of existing unmanned aerial vehicles, which may better meet the user's usage needs; the accuracy of launching can be improved by using geomagnetic triaxial data as the basis of judgment.

REFERENCE NUMERALS OF THE DRAWINGS

1—memory, 2—processor, 3—triaxial geomagnetic sensor, 4—launching structure, 5—button module, 6—power module, 7—display module, 10—unmanned aerial vehicle, 20—dispenser, 30—remote controller, 101—airframe, 102—propeller, 103—bottom surface.

The implementation, functional features, and advantages of the present application may be further explained with reference to the accompanying drawings in conjunction with the embodiments.

DETAILED DESCRIPTION OF THE EMBODIMENTS

The following may provide a clear and complete description of the technical solution in the embodiments of the present application in conjunction with the accompanying drawings. Obviously, the described embodiments are only a part of the embodiments of the present application, not all of them. Based on the embodiments in the present application, all other embodiments obtained by ordinary technicians in the field without creative work belong to the scope of protection of the present application.

Figure 1:
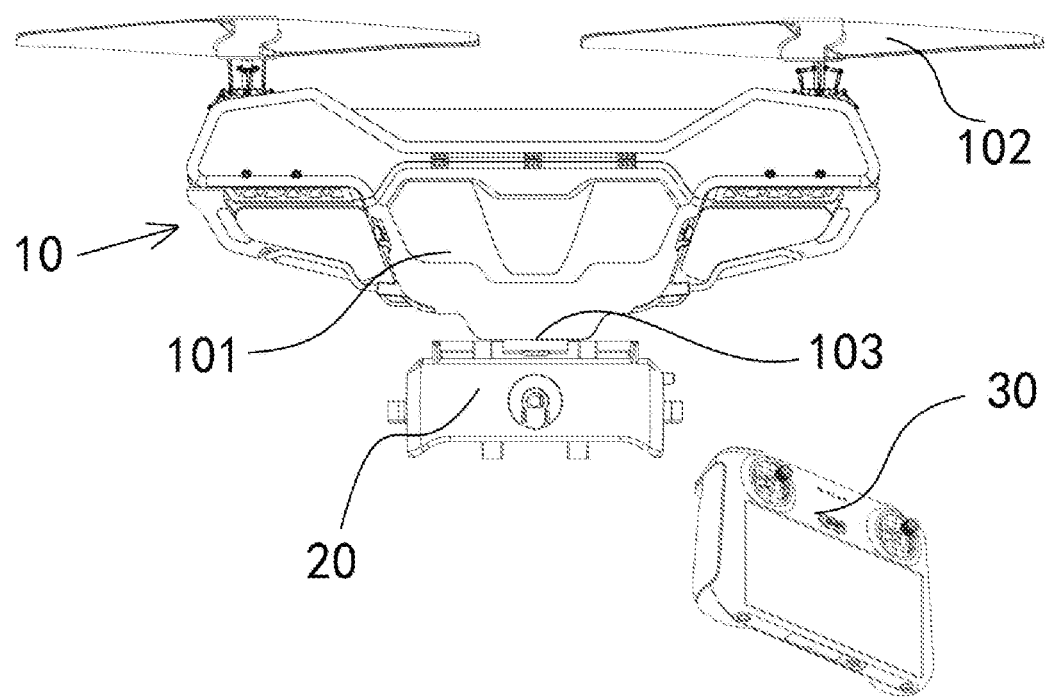
FIG. 1 is a schematic diagram of a terminal structure of a hardware operating environment according to the present application.

A geomagnetism-based launching method, a launching device and a dispenser are provided according to the present application, this technology can be applied to the vast majority of existing UAVs, improving the universality and accuracy of deployment. As shown in FIG. 1, FIG. 1 is a schematic diagram of a terminal structure of a hardware operating environment according to an embodiment of the present application. Specifically, FIG. 1 is an unmanned aerial vehicle system equipped with a dispenser. It should be understood that the UAV system is only for the convenience of illustration and does not impose any constraints on specific UAV application functional scenarios.

Referring to FIG. 1, the UAV system includes an UAV 10, a dispenser 20 and a remote controller 30. The UAV 10 includes a fuselage 101 and a propeller 102 arranged on the fuselage 101 for providing lift and flight control. A bottom surface 103 is provided below the fuselage 101. The dispenser 20 is detachably assembled and connected to the bottom surface 103. During specific assembly, methods such as buckles, straps, or screw connections can be used. The dispenser 20 moves synchronously with the UAV 10. The remote controller 30 is communicatively connected with the UAV 10 for controlling the flight of the UAV 10. The remote controller 30 may control the UAV 10 to rotate in place, and may also control the UAV 10 to rotate around a certain axis.

Figure 2:
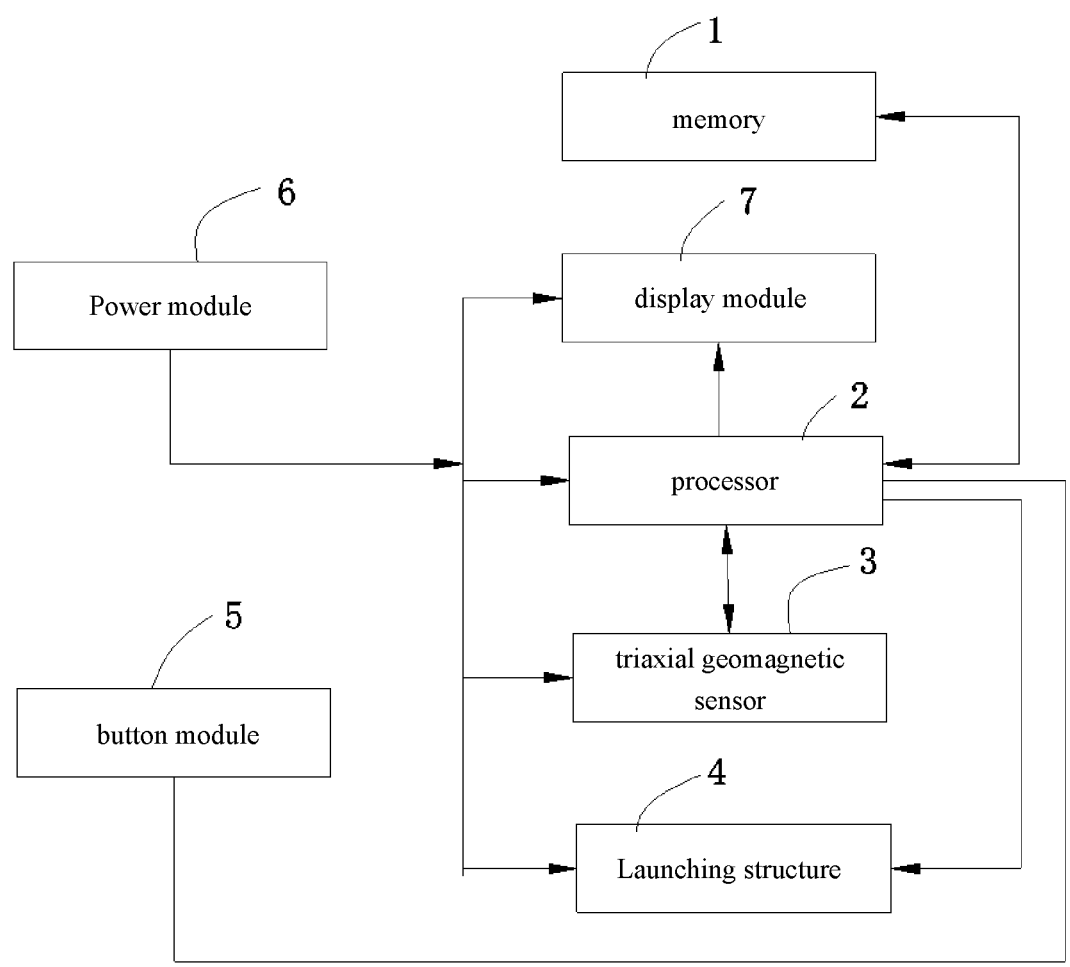
FIG. 2 is a schematic block diagram of a circuit structure of a dispenser of the present application.

As shown in FIG. 2, the dispenser 20 includes a memory 1, a processor 2, a triaxial geomagnetic sensor 3, a launching structure 4, a button module 5 and a power module 6. The processor 2 is electrically connected with the memory 1, the triaxial geomagnetic sensor 3, the launching structure 4 and the button module 5 respectively. The power module 6 supplies power to the processor 2, the triaxial geomagnetic sensor 3 and the launching structure 4 through a power supply execution circuit. Specifically, the execution circuit is a common power supply circuit, which is not described in detail here, but it should not be considered that the scheme of the present application is not fully disclosed.

The memory 1 may be a high-speed RAM memory or a non-volatile memory, such as a disk memory. Any memory that may be mounted in the dispenser 20 may be used. In addition to being integrated with processor 2, memory 1 may also be an optional storage device independent of the aforementioned processor 2. A launching program that may be run on the processor 2 is stored in the memory.

The triaxial geomagnetic sensor 3 is used to generate triaxial geomagnetic data. Specifically, the triaxial geomagnetic sensor may communicate with the processor 2 through I2C bus to achieve the interaction of geomagnetic triaxial data. The triaxial geomagnetic sensor 3 may measure the geomagnetic intensity of XYZ triaxial. The specific triaxial geomagnetic sensor 3 is implemented using existing structures, such as the model QMC5883 triaxial geomagnetic sensor.

The launching structure 4 is used to execute the launching action. In case that processor 2 outputs control instructions, the launching structure 4 is responsible for executing the control instruction. In some embodiments, the launching structure 4 may be a combination of an electric motor and a launching actuator structure. During specific control, the control instructions output by processor 2 are implemented through the execution of the motor. That is, in case that the motor receives the control command, the motor rotates at a certain angle to achieve the purpose of launching.

The button module 5 is connected with the processor 2 for starting the dispenser 20. The button module 5 is arranged outside the housing of the dispenser 20, which is convenient for users to use.

The power module 6 is used to supply power to each module. The power module uses 5V DC power supply. The button module 5 and the power module 6 are used in combination to form a power control unit. The power module includes a charging circuit, and the charging circuit may use a USB interface (such as TYPE-C) to charge the lithium battery of the power module 6 by using a single battery lithium-ion battery charging IC supporting OVP protection. In case that the button module 5 is not pressed, the whole dispenser 20 is in a power-off state. In case that the button module 5 is pressed, each module is powered on in turn, and the power supply locking is completed under the control of the processor 2.

In another embodiment, the dispenser 20 may further include a display module 7. The display module 7 is used to realize human-computer interaction.

It can be understood by those skilled in the art that the structure of the dispenser shown in FIG. 2 and above does not constitute a limitation on the dispenser, and may include more or less components than shown, or combine some components, or have different component arrangements.

Example 1

Figure 3:
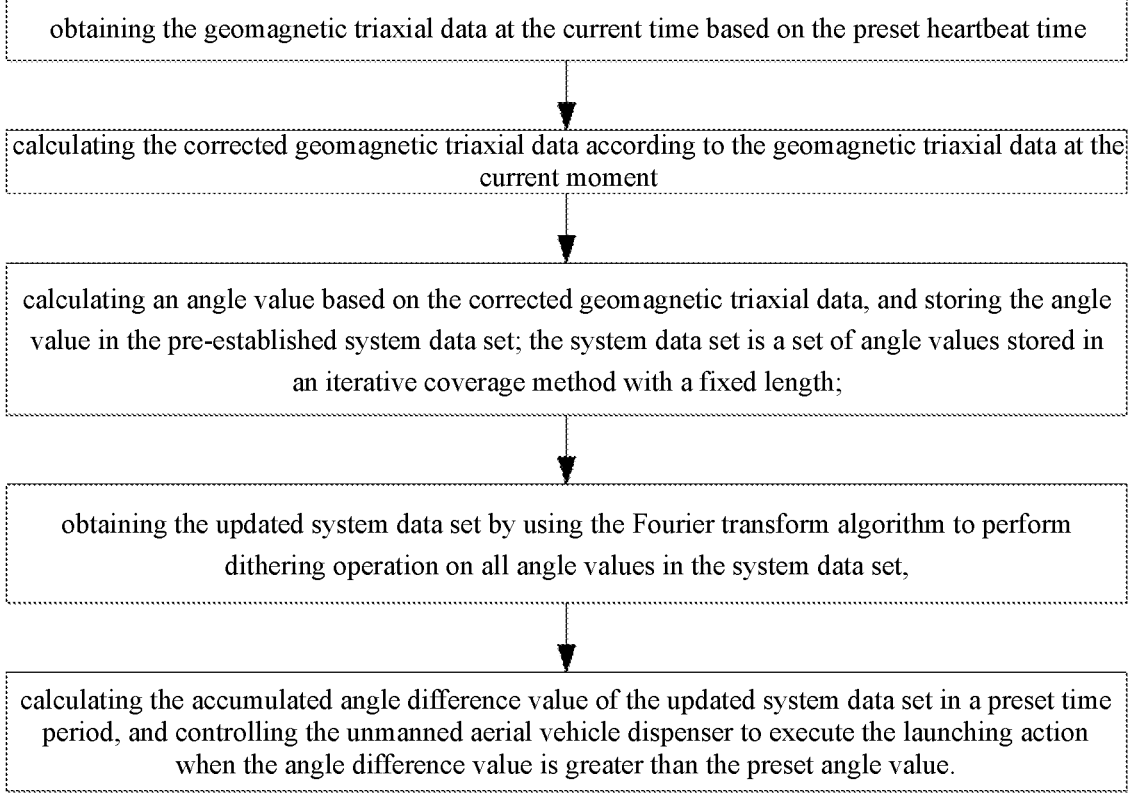
FIG. 3 is a schematic flow chart of the steps of an embodiment of the geomagnetic-based launching method of the present application.

Referring to FIG. 3, a geomagnetic-based launching method for unmanned aerial vehicle dispensers is provided according to the present application, which includes the following steps:
  obtaining the geomagnetic triaxial data at the current time according to a preset heartbeat time; the heartbeat time may be set according to the actual needs, such as collecting geomagnetic triaxial data every 10 milliseconds;
  calculating the corrected geomagnetic triaxial data according to the geomagnetic triaxial data at the current moment;
  calculating an angle value based on the corrected geomagnetic triaxial data, and storing the angle value in the pre-established system data set; the system data set is a set of angle values stored in an iterative coverage method with a fixed length;
  obtaining the updated system data set by using the Fourier transform algorithm to perform dithering operation on all angle values in the system data set,
  calculating the accumulated angle difference value of the updated system data set in a preset time period, and controlling the unmanned aerial vehicle dispenser to execute the launching action when the angle difference value is greater than the preset angle value.

Specifically, the launching method of this embodiment is achieved by using the parameters of the geomagnetic triaxial data as a basis to determine the difference in rotation angle within a predetermined time period, it is generally understood that the dispenser 20 is bundled with the UAV 10 for use, and during the flight of the UAV 10, the dispenser 20 also flies accordingly. The triaxial geomagnetic sensor 3 of the dispenser 20 may sense triaxial magnetic data. The data obtained by the triaxial geomagnetic sensor 3 may be truly fed back at a plane rotation angle with high accuracy. Therefore, the launching accuracy can be improved through the geomagnetic triaxial data. In addition, the dispenser 20 of this embodiment does not need to cooperate with additional structures during use, and is only related to the original flight attitude of the unmanned aerial vehicle 10; specifically, the launching action of the dispenser 20 is only related to the angle of rotation of the aircraft during a specific time, and is not related to whether the aircraft has an optoelectronic system; in this way, the dispenser may have strong versatility and meet the needs of various unmanned aerial vehicles.

In this embodiment, the triaxial geomagnetic sensor 3 continuously collects data according to the preset heartbeat time to ensure real-time data, and may collect multiple sets of data in a short period of time, providing a data foundation for the calculation process involved in subsequent launching actions.

It should be understood that in different usage scenarios, the magnetic field in the surrounding environment may have an impact on the detection of triaxial geomagnetic sensor 3. Therefore, it is necessary to modify the geomagnetic triaxial data generated by triaxial geomagnetic sensor 3 to improve accuracy.

The angle value of the current moment calculated according to the corrected geomagnetic triaxial data is stored in a pre-established system data set; in case that the triaxial geomagnetic sensor 3 continues to collect data for a period of time (i.e. after multiple heartbeat times), multiple angle values may be stored in the system data set; in case that the number of angle values exceeds the preset storage length of the system data set, if a new angle value is stored in the system data set, the earliest angle value stored in the system data set may be overwritten. The cumulative angle difference during that preset time period may be calculated based on multiple angle values stored in the system data set during a preset time period.

Specifically, before calculating the angle difference based on multiple angle values in the system data set, all angle values in the system data set need to be dithered by Fourier transform algorithm to obtain the updated system data set. Fourier transform algorithm can be the conventional technology of filtering processing technology, which is not described in detail in this embodiment, but it should not be considered that the technical scheme disclosed in the present application is incomplete. By using the Fourier transform algorithm for filtering processing, the interference can be reduced, thereby improving the accuracy of data in the system data set.

In this embodiment, the preset threshold condition is that the angle difference in the preset time period must be greater than the preset angle value to realize the launching; the preset time period and the preset angle value may be set according to different use occasions. For example, it may be set to rotate 720 degrees within 2 seconds (that is, the angle difference is 720 degrees) before performing the launching action.

It should be understood that in some special cases, the angle difference in the preset time period is much larger than the preset angle value. For example, in case that a malfunction occurs, the rotation angle within 2 seconds is 2000°, and the preset threshold condition is 700° within 2 seconds for launching. At this time, the rotation angle significantly exceeds the preset angle value, and it should be considered an abnormal sudden situation. Therefore, in this embodiment, after determining that the angle difference is greater than the preset angle value, a flight anomaly detection step should also be added, that is, continuously determining whether the angle difference is greater than the preset limit angle threshold value, if it is greater than the preset limit angle threshold value, the launching action is not executed. Specifically, as an example, the preset threshold condition may be set to execute the launching action when the difference in rotation angle within 2 seconds reaches 1000° and is less than 2000°, if the difference in rotation angle within 2 seconds reaches 2000°, the launching action may not be executed. This arrangement may better solve the problem of accidental launching caused by unexpected situations under abnormal conditions.

It should be understood that in some embodiments, the above preset values may be revised through the display module 7, which is more convenient for customers to modify according to specific usage scenarios.

It should be understood that in some embodiments, the heartbeat time may be obtained based on preset parameters of the device, as follows:
before the steps of obtaining the geomagnetic triaxial data at the current time based on the preset heartbeat time, including:
obtaining the heartbeat time according to the following formula:

$$Ttick = TTok * Tqmc$$

TTok represents the communication time between dispenser processor 2 and triaxial magnetic sensor 3, while Tqmc represents the sampling period of triaxial magnetic sensor 3; $TTok \geq 2*Tqmc$.

Specifically, obtaining the corrected geomagnetic triaxial data based on the current geomagnetic triaxial data and geomagnetic triaxial correction parameters, including:
Weighting the X-axis data in the geomagnetic triaxial data at the current moment according to the following formula:

$$X_{gain} = K_x * (X_n - X_{offset})$$

$X_{gain}$ represents the X-axis data of the weighted geomagnetic triaxial data, $K_x$ represents the magnetic field correction factor of the geomagnetic triaxial correction parameter in the X-axis direction, $X_n$ represents the X-axis data of the geomagnetic triaxial data at the current moment, and $X_{Offset}$ represents an axial value offset of the geomagnetic triaxial correction parameter in the X-axis direction;
weighting the Y-axis data in the geomagnetic triaxial data at the current moment according to the following formula:

$$Y_{gain} = K_y * (Y_n - Y_{offset}),$$

$Y_{gain}$ represents the Y-axis data of the weighted geomagnetic triaxial data, Ky represents the magnetic field correction factor of the geomagnetic triaxial correction parameter in the Y-axis direction, $Y_n$ represents the Y-axis data of the geomagnetic triaxial data at the current moment, and $Y_{offset}$ represents an axis value offset of the geomagnetic triaxial correction parameter in the Y-axis direction;
weighting the Z-axis data in the geomagnetic triaxial data at the current moment according to the following formula:

$$Z_{gain} = K_z * (Z_n - Z_{offset}),$$

$Z_{gain}$ represents the Z-axis data of the weighted geomagnetic triaxial data, Kz represents the magnetic field correction factor of the geomagnetic triaxial correction parameter in the Z-axis direction, $Z_n$ represents the Z-axis data of the geomagnetic triaxial data at the current moment, and $Z_{offset}$ represents an axis value offset of the geomagnetic triaxial correction parameter in the Z-axis direction.

The weighting processing method for X-axis data, Y-axis data, and Z-axis data is the same; the magnetic field correction factor and axis offset may use pre stored data, which may be pre-set data at the time of product delivery or real-time generated and saved according to preset methods during actual use.

Of course, dynamic data may also be used for magnetic field correction factor and axis value offset, and the specific implementation is as follows:

In some specific embodiments, the step of calculating the corrected geomagnetic triaxial data according to the geomagnetic triaxial data at the current moment includes:
  obtaining a new geomagnetic triaxial extreme value data by comparing the current geomagnetic triaxial data with the previous geomagnetic triaxial extreme value data; specifically, if the heartbeat time is 10 milliseconds and the current time is 60 milliseconds, then the previous time was 50 milliseconds, and so on;
  obtaining the geomagnetic triaxial correction parameters based on the new geomagnetic triaxial extreme value data, the geomagnetic triaxial correction parameters include magnetic field correction factor and axis value offset;
  obtaining the corrected geomagnetic triaxial data based on the current geomagnetic triaxial data and the geomagnetic triaxial correction parameters.

Specifically, comparing the current geomagnetic triaxial data with the previous geomagnetic triaxial extreme value data, the steps to obtain a new geomagnetic triaxial extreme value data include:
  obtaining the geomagnetic triaxial extreme value deviation by calculating the absolute difference between the current geomagnetic triaxial data and the previous geomagnetic triaxial extreme value data;
  comparing the deviation of the geomagnetic triaxial extreme value with the preset reasonable deviation value of the geomagnetic triaxial extreme value, if the deviation of the geomagnetic triaxial extreme value is greater than the preset reasonable deviation of the geomagnetic triaxial extreme value, taking the geomagnetic triaxial extreme value data of the previous moment as the new geomagnetic triaxial extreme value data, if the deviation of the geomagnetic triaxial extreme value is less than or equal to the preset reasonable deviation of the geomagnetic triaxial extreme value, the following steps are executed:
  comparing the geomagnetic triaxial data at the current moment with the geomagnetic triaxial extreme value data at the previous moment according to the following formula:

$X$ axis maximum value: if $X_n > X_{max}$ and $|X_n - X_{max}| < X_{threshold}$;

Then $X_{max} = X_n$, otherwise, $X_{max} = X_{max}$;

$X$ axis minimum value: if $X_n < X_{min}$ and $|X_n - X_{min}| < X_{threshold}$;

Then $X_{min} = X_n$, otherwise, $X_{min} = X_{min}$;

$Y$ axis maximum value: if $Y_n > Y_{max}$ and $|Y_n - Y_{max}| < Y_{threshold}$;

Then $Y_{max} = Y_n$, otherwise, $Y_{max} = Y_{max}$;

$Y$ axis minimum value: if $n < Y_{min}$ and $|Y_n - Y_{min}| < Y_{threshold}$;

Then $Y_{min} = Y_n$, otherwise, $Y_{min} = Y_{min}$;

$Z$ axis maximum value: If $Z_n > Z_{max}$ and $|Z_n - Z_{max}| < Z_{threshold}$;

Then $Z_{max} = Z_n$, otherwise, $Z_{max} = Z_{max}$;

Z-axis minimum value: if $Z_n < Z_{min}$ and $|Z_n - Z_{min}| < Z_{threshold}$;

Then $Z_{min} = Z_n$, otherwise, $Z_{min} = Z_{min}$;

Xn, Yn, and Zn represent the current geomagnetic triaxial data in the X-axis direction, Y-axis direction, and Z-axis direction, respectively, $X_{max}$, $Y_{max}$, and $Z_{max}$ represent the maximum values of geomagnetic triaxial extreme values in the X-axis direction, Y-axis direction, and Z-axis direction, respectively, $X_{min}$, $Y_{min}$, and $Z_{min}$ represent the minimum values of geomagnetic triaxial extreme values in the X-axis, Y-axis, and Z-axis directions, respectively, $X_{threshold}$, $Y_{threshold}$, and $Z_{threshold}$ represent the geomagnetic triaxial extreme deviation in the X-axis direction, Y-axis direction, and Z-axis direction, respectively.

Specifically, obtaining the geomagnetic triaxial correction parameters based on the new geomagnetic triaxial extreme value data including:
  obtaining the axis value offset according to the following formula:

$X$-axis value offset: $X_{offset} = (X_{max} + X_{min})/2$;

$X_{max}$ represents the maximum value of the geomagnetic triaxial extreme value in the X-axis direction, and $X_{min}$ represents the minimum value of the geomagnetic triaxial extreme value in the X-axis direction;

$Y$-axis value offset: $Y_{offset} = (Y_{max} + Y_{min})/2$;

$Y_{max}$ represents the maximum value of the geomagnetic triaxial extreme value in the Y-axis direction, and $Y_{min}$ represents the minimum value of the geomagnetic triaxial extreme value in the Y-axis direction;

$Z$-axis value offset: $Z_{offset} = (Z_{max} + Z_{min})/2$;

$Z_{max}$ represents the maximum value of the geomagnetic triaxial extreme value in the Z-axis direction, and Z min represents the minimum value of the geomagnetic triaxial extreme value in the Z-axis direction;

$X_{offset}$, $Y_{offset}$ and $Z_{offset}$ respectively represent the axis value offset in the X-axis direction, Y-axis direction and Y-axis direction.

The above-mentioned axis value offset is obtained based on the previous geomagnetic conversion data set. Since the calculation methods of X-axis value offset, Y-axis value offset and Z-axis value offset are the same, the following description may take X-axis value offset as an example. The X-axis value offset is calculated based on the previous geomagnetic rotation data set, and it should be understood that the previous geomagnetic conversion data set is dynamically changing. Specifically, after pressing the button module 5, the triaxial geomagnetic sensor 3 may generate corresponding triaxial geomagnetic data according to the preset heartbeat time (such as every 10 milliseconds), and these data may be pre-stored in the memory 1; after a period of startup, these geomagnetic triaxial data may form the original geomagnetic triaxial data set; in case that at least two geomagnetic triaxial data are accumulated, the corresponding axial value offset may be calculated according to the above formula.

Specifically, obtaining the geomagnetic triaxial correction parameters based on the new geomagnetic triaxial extreme value data including:
  Obtaining the magnetic field correction factor according to the following formula:

$X$-axis magnetic field correction factor: $K_x = (X_{max} \times X_{max} + 2 \times X_{min})/(2 \times X_{max}) - X_{min}/2 - X_{min}/X_{max}$;

$X_{max}$ represents the maximum value of the geomagnetic triaxial extreme value in the X-axis direction, and $X_{min}$ represents the minimum value of the geomagnetic triaxial extreme value in the X-axis direction;

Y-axis magnetic field correction factor: $K_y = (Y_{max} \times Y_{max} + 2 \times Y_{min})/(2 \times Y_{max}) - Y_{min}/2 - Y_{min}/Y_{max}$;

$Y_{max}$ represents the maximum value of the geomagnetic triaxial extreme value in the Y-axis direction, and $Y_{min}$ represents the minimum value of the geomagnetic triaxial extreme value in the Y-axis direction;

Z-axis magnetic field correction factor: $K_z = (Z_{max} \times Z_{max} + 2 \times Z_{min})/(2 \times Z_{max}) - Z_{min}/2 - Z_{min}/Z_{max}$;

$Z_{max}$ represents the maximum value of the geomagnetic triaxial extreme value in the Z-axis direction, and $Z_{min}$ represents the minimum value of the geomagnetic triaxial extreme value in the Z-axis direction;

$K_x$, $K_y$, and $K_z$ represent the magnetic field correction factors in the X-axis direction, Y-axis direction and Y-axis direction respectively.

Similarly, the above magnetic field correction factor is obtained based on the previous geomagnetic conversion data set. Since the calculation methods of X-axis magnetic field correction factor, Y-axis magnetic field correction factor and Z-axis magnetic field correction factor are the same, the following description may take X-axis magnetic field correction factor as an example. The X-axis magnetic field correction factor is calculated based on the previous geomagnetic rotation data set, and it should be understood that the previous geomagnetic conversion data set is dynamically changing. Specifically, after pressing the button module 5, the triaxial geomagnetic sensor 3 may generate corresponding triaxial geomagnetic data according to the preset heartbeat time (such as every 10 milliseconds), and these data may be pre-stored in the memory 1; after starting for a period of time, these triaxial geomagnetic data may form the original triaxial geomagnetic data set; in case that at least two triaxial geomagnetic data are accumulated, the corresponding magnetic field correction factor may be calculated according to the above formula.

The geomagnetic triaxial correction parameters of the above embodiments are dynamically changing, which are continuously accumulated with the increase of time after starting. The more accumulated data, the higher its accuracy.

By adopting the above technology, the error may be obviously eliminated. In the actual test, in the indoor situation where there is no wind test, the success rate reaches 100%; in windy outdoor situations, the success rate of the first launch is over 90%, and the success rate of the second launch can reach 100%. Compared to the situation where calibration was not carried out through dynamic geomagnetic triaxial correction parameters, the success rate of its deployment has been greatly improved.

In some embodiments, the steps of obtaining the geomagnetic triaxial data at the current time based on the preset heartbeat time include:

restarting the UAV dispenser and initializing the data;
the geomagnetic triaxial extreme value data at the previous moment is the initial data reconstructed after the initialization operation.

The previous geomagnetic conversion data set for forming dynamic geomagnetic triaxial correction parameters is re-accumulated by the dispenser 20 after each startup and initialization, that is, a new database may be formed after each startup, and the data formed before shutdown may not be used as the data component after this startup. This technology mainly takes into account the differences in the use environment after each startup. If the geomagnetic data in the previous use scene is included in the subsequent calculation process, it may affect the release accuracy in the current use scene. Therefore, in this embodiment, the geomagnetic data is initialized after each restart of the dispenser, which may further reduce the interference and improve the dispensing accuracy.

As shown in FIG. 1 and FIG. 2, the previous geomagnetic conversion data set of this embodiment is formed after the button module 5 is pressed and the dispenser 20 is restarted, and the newly formed data is suitable for the current startup environment. Specifically, the initialization process is realized by triggering the button module 5, and the initialized dispenser 20 starts to operate normally.

Specifically, the initialization operation includes first reading the ID data of the triaxial geomagnetic sensor 3, then sending an initialization instruction set to the triaxial geomagnetic sensor 3, and then initializing the geomagnetic correction parameters. Moreover, the geomagnetic triaxial data of the triaxial geomagnetic sensor 3 continues to be read to update the geomagnetic correction parameters. Geomagnetic correction parameters include the above-mentioned axial value offset and magnetic field correction factor.

In some embodiments, the step of calculating the angle value according to the corrected geomagnetic triaxial data includes:

extracting X-axis data and Y-axis data from the corrected geomagnetic triaxial data, and performing arctangent function operation to calculate a rotation radian on the XY-axis plane at the current moment;

extracting X-axis data and Z-axis data from the corrected geomagnetic triaxial data, and performing arctangent function operation to calculate a rotation radian on the XZ axis plane at the current moment;

extracting Y-axis data and Z-axis data from the corrected geomagnetic triaxial data, and performing arctangent function operation to calculate a rotation radian on the YZ axis plane at the current moment.

Specifically, the rotation radian of the XY axis surface is calculated by using the following formula:

$$XY_{azimuth} = a\tan(Y_{gain}, X_{gain}) * 180/\pi + 180;$$

$Y_{gain}$ represents weighted Y-axis data, $X_{gain}$ represents weighted X-axis data, atan ($Y_{gain}$, $X_{gain}$) function calculates radians on the XY axis plane, $\pi$ represents Pi, and $XY_{azimuth}$ represents rotation radians on the XY axis plane;

the rotation radian of the XZ axis surface is calculated by using the following formula:

$$XZ_{azimuth} = a\tan(Z_{gain}, X_{gain}) * 180/\pi + 180;$$

$Z_{gain}$ represents weighted Z-axis data, $X_{gain}$ represents weighted X-axis data, atan ($Z_{gain}$, $X_{gain}$) function calculates radians on XZ axis plane, $\pi$ represents Pi, $XZ_{azimuth}$ azimuth represents rotation radians on XZ axis plane;

the rotation radian of the YZ axis surface is calculated by using the following formula:

$$ZY_{azimuth} = a\tan(Y_{gain}, Z_{gain}) * 180/\pi + 180;$$

$Y_{gain}$ represents the weighted Y-axis data, $Z_{gain}$ represents the weighted Z-axis data, atan ($Y_{gain}$, $Z_{gain}$) function calculates the radians on the YZ axis plane, $\pi$ represents the Pi, and $YZ_{azimuth}$ represents the rotation radians on the YZ axis plane.

The current angle value may be conveniently calculated through the rotation radian of the XY axis plane, the XZ axis plane, and the YZ axis plane.

In some embodiments, the system data set is set to a two-dimensional array of 3*N;

The steps after storing the angle values into a pre established system data set include:

establishing the current index for angle values;

In case that the angle values in the system data set undergo iterative coverage operations, the index is zeroed and the current index is re established for the angle values after the iterative coverage operation.

By establishing the current index, it is convenient for the system or operators to quickly and accurately locate the angle value data in the system data set; after the dispenser 20 restarts, as the angle value data in the system data set may be initialized and re formed into new data, it is necessary to re establish the current index based on the current data to maintain association with the angle value data in the system data set at any time.

In some embodiments, the step of using Fourier transform algorithm to dither all angle values in the system data set to obtain an updated system data set includes:

S1, performing discrete Fourier transform on the angle values in the system data set according to the following formula to obtain discrete data in frequency domain:

$$X(k) = DFT[x(n)] = \sum_{n=0}^{N-1} x(n)e^{-j\frac{2\pi}{N}nk} = \sum_{n=0}^{N-1} x(n)W_N^{nk}$$

$$0 \le k \le N-1$$

X(k) represents discrete data in frequency domain, DFT represents discrete Fourier transform, x(n) represents data corresponding to N position in the system data set, N represents data quantity of the system data set, E represents the base of natural logarithm, and WN represents the phase representation corresponding to the periodic function of w period 2π;

S2, processing the discrete data in frequency domain obtained in step S1 according to the following ternary operation formula:

$X_1(k)=(X(k)>\text{fbase})?X(k-1):X(k)$

Specifically, the above formula is a ternary operation formula of C language algorithm, which is used to represent the low-pass function; the operation logic of the above formula is: when the frequency is greater than the preset frequency, X(k)=X(k−1) is executed, otherwise it is not executed.

X (k) represents the discrete data in the frequency domain obtained in step S1, fbase represents the preset frequency, and X₁(k) represents the discrete data in the frequency domain after processing X (k). Preferably, the fbase quantification is 45 Hz for the following reasons: the frequency variation amplitude caused by flight jitter is within 18 Hz, so according to the error avoidance strategy and the design principle of 2 times jitter error rate, the preset frequency is set to be greater than 36 Hz, and a certain controllable frequency is reserved, so fbase is quantified as 45 Hz;

based on the above algorithm, low-pass filtering may be performed on discrete data in the frequency domain to obtain the filtered discrete data X₁(k) in the frequency domain;

S3, performing inverse discrete Fourier transform on the discrete data in frequency domain obtained in step S2 according to the following formula, so as to obtain a dithered system data set:

$$X_1(n) = IDFT[x_1(k)] = \frac{1}{N}\sum_{k=0}^{N-1} X_1(k)e^{j\frac{2\pi}{N}nk} = \frac{1}{N}\sum_{k=0}^{N-1} X_1(k)W_N^{nk}$$

$$0 \le n \le N-1$$

x₁(n) represents the data corresponding to the n position in the dithered system data set, IDFT represents the inverse discrete Fourier transform, x₁(k) represents the discrete data in the frequency domain obtained in step S2, N represents the data quantity of the system data set, E represents the base of natural logarithm, and WN represents the phase representation corresponding to the periodic function with a period of a w;

S4, covering the initial discrete data x(n) in the frequency domain with the discrete data x₁(n) obtained in step S3; the final system data set obtained is the system data set after dithering operation.

Regarding other related content of the Fourier transform algorithm mentioned above, reference can be made to existing technologies, and it is not elaborated here.

In some embodiments, in case that the angle difference is greater than the preset angle value, the steps of controlling the UAV dispenser 20 to execute the launching action include:

determining whether the angle difference continues to increase or decrease within the preset time period;

If so, determining whether the angle difference is greater than the preset angle value.

According to this embodiment, before determining whether the angle difference is greater than the preset angle value, the first step is to determine whether the angle difference continues to increase or decrease within the preset time period, thereby determining whether the rotation of the aircraft is manually controlled within the preset time period, and after determining that the aircraft is manipulated by human, subsequent operations for triggering the release action can be carried out. If the angle difference increases or decreases steadily in the preset time period, it means that the operator controls the aircraft to rotate continuously in the same direction in order to trigger the launching action in the preset time period; if the angle difference increases and decreases at the same time in the preset time period, it shows that the rotation of the aircraft in the preset time period may be caused by external force or its own fault, that is, it is not necessary to perform the launching action at this time. Based on the scheme of this embodiment, the situation of non-human manipulation may be screened out, thus avoiding the problem of wrong launching to a certain extent.

Example 2

Figure 4:
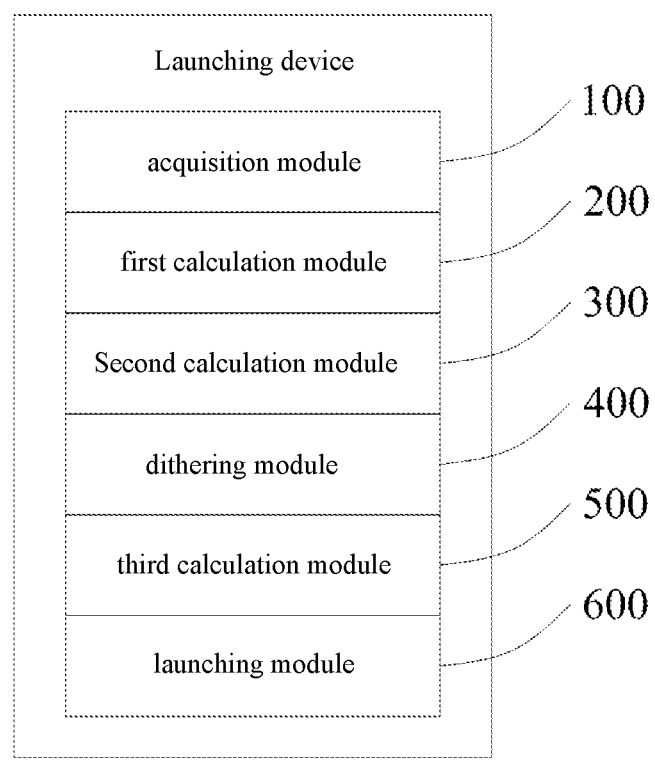
FIG. 4 is a schematic structural diagram of an embodiment of a launching device of the present application.

Correspondingly, referring to FIG. 4, a launching device is further provided in this embodiment, which includes:

an acquisition module used for acquiring the geomagnetic triaxial data at the current moment at regular intervals according to the preset heartbeat time;

a first calculation module for calculating the corrected geomagnetic triaxial data according to the geomagnetic triaxial data at the current moment;

a second calculation module used for calculating an angle value according to the corrected geomagnetic triaxial data and storing the angle value in a pre-established system data set;

a dithering module for performing shake elimination operations on all angle values in the system data set using the Fourier transform algorithm to obtain the updated system data set;

a third calculation module for calculating the cumulative angle difference of the updated system data set within the preset time period;

a launch module used for controlling the UAV dispenser 20 to execute the launch action in case that the angle difference is greater than the preset angle value.

Specifically, the execution methods and steps of each module in this embodiment are the same as the geomagnetic based launching method described above, and are not elaborated here.

In this embodiment, the throwing control of the dispenser 20 may be realized only by calculating the angle difference according to the geomagnetic triaxial data, the operation method is simple, the launching is precise, and there is no need to change the structure of the existing unmanned aerial vehicle, which may better meet the user's usage needs.

Example 3

A dispenser 20 is provided in this embodiment, which includes a memory 1, a processor 2, a triaxial geomagnetic sensor 3, a launching structure 4 and a launching program stored in the memory 1 and running on the processor 2.

The triaxial geomagnetic sensor 3 is used for generating triaxial geomagnetic data;

The launching structure 4 is used for executing launching action;

The steps of implementing the geomagnetic based launching method described in the above embodiment when the launching program is executed by processor 2.

Specifically, the launching method corresponding to this embodiment is the same as the geomagnetic launching method described in the first embodiment, and is not described in detail here, but it should not be considered that the technical scheme of this embodiment is not fully disclosed.

The dispenser 20 of this embodiment may be used in cooperation with unmanned aerial vehicles, and the data source of the dispenser 20 when working only depends on the flight attitude data of the unmanned aerial vehicles. In the specific work process, the launch may be realized by analyzing the flight attitude data (that is, triaxial geomagnetic data), which has strong adaptability to unmanned aerial vehicles, may be suitable for many different types of aircraft, and may improve the launch accuracy.

A computer readable storage medium is provided in this embodiment, on which there is stored a launching program, the launching program is executed by processor 2 to implement the steps of the geomagnetic based launching method described in the first embodiment.

The computer-readable storage medium may be any available medium that a computer may access, or a data storage device such as a server or data center that contains one or more available media integrations. It should be noted that ordinary technical personnel in this field may understand that all or part of the steps in the various methods of the above embodiments may be completed by instructing the relevant hardware through computer programs, the computer programs may be stored in computer-readable storage media, which may include but are not limited to: magnetic media (such as floppy disk, hard disk and magnetic tape), optical media (such as Digital Versatile Disc (DVD)), or semiconductor media (such as Solid State Disk (SSD)).

It should be noted that in this paper, the terms "including", "containing" or any other variation thereof are intended to cover non-exclusive inclusion, so that a process, method, article or system including a series of elements includes not only those elements, but also other elements not explicitly listed, or elements inherent to such process, method, article or system. Without more restrictions, an element defined by the phrase "including one" does not exclude the existence of other identical elements in the process, method, article or system that includes the element.

The serial numbers of the above embodiments of the present application are only for description and do not represent the advantages and disadvantages of the embodiments.

The above is only the preferred embodiment of the present application, which does not limit the patent scope of the present application. Any equivalent structure or equivalent process transformation made by using the description and attached drawings of the present application, or directly or indirectly used in other related technical fields, are equally included in the patent protection scope of the present application.

What is claimed is:

1. A launching method for an unmanned aerial vehicle dispenser based on geomagnetism, comprising:
    obtaining geomagnetic triaxial data at current time according to a preset heartbeat time;
    calculating a corrected geomagnetic triaxial data according to the geomagnetic triaxial data at the current moment;
    calculating an angle value according to the corrected geomagnetic triaxial data, and storing the angle value in a pre-established system data set, the pre-established system data set has a fixed length and is a set of the angle values stored by way of an iterative overlap;
    obtaining an updated system data set by using a Fourier transform algorithm to on all of the angle values in the system data set,
    calculating an angle difference value of the updated system data set accumulated in a preset time period, and controlling the unmanned aerial vehicle dispenser to execute a launching action when the angle difference value is greater than the preset angle value, and
    wherein calculating the corrected geomagnetic triaxial data according to the geomagnetic triaxial data at the current moment comprises:
    obtaining a new geomagnetic triaxial extreme value data by comparing the geomagnetic triaxial data at the current moment with a previous geomagnetic triaxial extreme value data;
    obtaining geomagnetic triaxial correction parameters based on the new geomagnetic triaxial extreme value data;
    obtaining the corrected geomagnetic triaxial data based on the geomagnetic triaxial data at the current moment and the geomagnetic triaxial correction parameters.

2. The launching method according to claim 1, wherein obtaining the new geomagnetic triaxial extreme value data by comparing the geomagnetic triaxial data at the current moment with the previous geomagnetic triaxial extreme value data comprises:
    obtaining a geomagnetic triaxial extreme value deviation by calculating an absolute difference between the geomagnetic triaxial data at the current moment and the previous geomagnetic triaxial extreme value data;

comparing geomagnetic triaxial extreme value deviation with a preset reasonable deviation value of the geomagnetic triaxial extreme value, if the geomagnetic triaxial extreme value deviation is greater than the preset reasonable deviation value of the geomagnetic triaxial extreme value, taking the previous geomagnetic triaxial extreme value data as the new geomagnetic triaxial extreme value data, if the geomagnetic triaxial extreme value is less than or equal to the preset reasonable deviation of the geomagnetic triaxial extreme value, following steps are executed:

comparing the geomagnetic triaxial data at the current moment with the previous geomagnetic triaxial extreme value data according to following formulas:

$X$ axis maximum value: if $X_n > X_{max}$ and $|X_n - X_{max}| < X_{threshold}$;

Then $X_{max} = X_n$, otherwise, $X_{max} = X_{max}$;

$X$ axis minimum value: if $X_n < X_{min}$ and $|X_n - X_{min}| < X_{threshold}$;

Then $X_{min} = X_n$, otherwise, $X_{min} = X_{min}$;

$Y$ axis maximum value: if $Y_n > Y_{max}$ and $|Y_n - Y_{max}| < Y_{threshold}$;

Then $Y_{max} = Y_n$, otherwise, $Y_{max} = Y_{max}$;

$Y$ axis minimum value: if $n < Y_{min}$ and $|Y_n - Y_{min}| Y_{threshold}$;

Then $Y_{min} = Y_n$, otherwise, $Y_{min} = Y_{min}$;

$Z$ axis maximum value: If $Z_n > Z_{max}$ and $|Z_n - Z_{max}| < Z_{threshold}$;

Then $Z_{max} = Z_n$, otherwise, $Z_{max} = Z_{max}$;

$Z$-axis minimum value: if $Z_n < Z_{min}$ and $|Z_n - Z_{min}| < Z_{threshold}$;

Then $Z_{min} = Z_n$, otherwise, $Z_{min} = Z_{min}$;

$X_n$, $Y_n$, and $Z_n$ represent the geomagnetic triaxial data at the current moment in X-axis direction, Y-axis direction, and Z-axis direction, respectively, $X_{max}$, $Y_{max}$, and $Z_{max}$ represent maximum values of geomagnetic triaxial extreme values data in the X-axis direction, Y-axis direction, and Z-axis direction, respectively, $X_{min}$, $Y_{min}$, and $Z_{min}$ represent minimum values of the geomagnetic triaxial extreme values data in the X-axis, Y-axis, and Z-axis directions, respectively, the geomagnetic triaxial correction parameters comprise magnetic field correction factors and axial value offsets, $X_{threshold}$, $Y_{threshold}$, and $Z_{threshold}$ represent the geomagnetic triaxial extreme value deviation in the X-axis direction, Y-axis direction, and Z-axis direction, respectively.

3. The launching method according to claim 2, wherein obtaining the geomagnetic triaxial correction parameters based on the new geomagnetic triaxial extreme value data comprises:

obtaining the axis value offset according to the following formulas:

X-axis value offset: $X_{offset} = (X_{max} \times X_{min})/2$;

$X_{max}$ represents a maximum value of the geomagnetic triaxial extreme value in the X-axis direction, and $X_{min}$ represents a minimum value of the geomagnetic triaxial extreme value in the X-axis direction;

Y-axis value offset: $Y_{offset} = (Y_{max} - Y_{min})/2$;

$Y_{max}$ represents a maximum value of the geomagnetic triaxial extreme value in the Y-axis direction, and $Y_{min}$ represents a minimum value of the geomagnetic triaxial extreme value in the Y-axis direction;

Z-axis value offset: $Z_{offset} = (Z_{max} + Z_{min})/2$;

$Z_{max}$ represents a maximum value of the geomagnetic triaxial extreme value in the Z-axis direction, and $Z_{min}$ represents a minimum value of the geomagnetic triaxial extreme value in the Z-axis direction;

$X_{offset}$, $Y_{offset}$ and $Z_{offset}$ respectively represent the axis value offsets in the X-axis direction, Y-axis direction and Y-axis direction.

4. The launching method according to claim 3, wherein obtaining the geomagnetic triaxial correction parameters based on the new geomagnetic triaxial extreme value data comprises:

Obtaining the magnetic field correction factor according to the following formulas:

X-axis magnetic field correction factor: $K_x = (X_{max} \times X_{max} + 2 \times X_{min})/(2 \times X_{max}) - X_{min}/2 - X_{min}/X_{max}$;

$X_{max}$ represents the maximum value of the geomagnetic triaxial extreme value in the X-axis direction, and $X_{min}$ represents the minimum value of the geomagnetic triaxial extreme value in the X-axis direction;

Y-axis magnetic field correction factor: $K_y = (Y_{max} \times Y_{max} + 2 \times Y_{min})/(2 \times Y_{max}) - Y_{min}/2 - Y_{min}/Y_{max}$;

$Y_{max}$ represents the maximum value of the geomagnetic triaxial extreme value in the Y-axis direction, and $Y_{min}$ represents the minimum value of the geomagnetic triaxial extreme value in the Y-axis direction;

Z-axis magnetic field correction factor: $K_z = (Z_{max} \times Z_{max} + 2 \times Z_{min})/(2 \times Z_{max}) - Z_{min}/2 - Z_{min}/Z_{max}$;

$Z_{max}$ represents the maximum value of the geomagnetic triaxial extreme value in the Z-axis direction, and $Z_{min}$ represents the minimum value of the geomagnetic triaxial extreme value in the Z-axis direction;

$K_x$, $K_y$, and $K_z$ represent the magnetic field correction factors in the X-axis direction, Y-axis direction and Y-axis direction respectively.

5. The launching method according to claim 4, wherein obtaining the corrected geomagnetic triaxial data based on the current geomagnetic triaxial data and geomagnetic triaxial correction parameters comprises:

Weighting X-axis data in the geomagnetic triaxial data at the current moment according to following formulas:

$X_{gain} = K_x * (X_n - X_{offset})$ $X_{gain}$ represents X-axis data of weighted geomagnetic triaxial data, $K_x$ represents the magnetic field correction factor of the geomagnetic triaxial correction parameter in the X-axis direction, $X_n$ represents the X-axis data of the geomagnetic triaxial data at the current moment, and $X_{offset}$ represents the axial value offset of the geomagnetic triaxial correction parameter in the X-axis direction;

weighting Y-axis data in the geomagnetic triaxial data at the current moment according to the following formula:

$Y_{gain} = K_y * (Y_n - Y_{offset})$, $Y_{gain}$ represents Y-axis data of the weighted geomagnetic triaxial data, $K_y$ represents the magnetic field correction factor of the geomagnetic triaxial correction parameter in the Y-axis direction, $Y_n$ represents the Y-axis data of the geomagnetic triaxial data at the current moment, and $Y_{offset}$ represents the axis value offset of the geomagnetic triaxial correction parameter in the Y-axis direction;

weighting Z axis data in the geomagnetic triaxial data at the current moment according to the following formula:

$Z_{gain}=K_z*(Z_n-Z_{offset})$, $Z_{gain}$ represents Z-axis data of weighted geomagnetic triaxial data, $K_z$ represents the magnetic field correction factor of the geomagnetic triaxial correction parameter in the Z-axis direction, $Z_n$ represents the Z-axis data of the geomagnetic triaxial data at the current moment, and $Z_{offset}$ represents the axis value offset of the geomagnetic triaxial correction parameter in the Z-axis direction.

6. The launching method according to claim 1, wherein before the steps of obtaining the geomagnetic triaxial data at the current time according to on the preset heartbeat time, comprising:
   restarting the UAV dispenser and performing initialization operation on data;
   wherein the previous geomagnetic triaxial extreme value data is initial data reconstructed after the initialization operation.

7. The launching method according to claim 1, wherein the step of calculating the angle value according to the corrected geomagnetic triaxial data comprises:
   extracting X-axis data and Y-axis data from the corrected geomagnetic triaxial data, and performing arctangent function operation to calculate a rotation radian on XY-axis plane at the current moment;
   extracting X-axis data and Z-axis data from the corrected geomagnetic triaxial data, and performing arctangent function operation to calculate a rotation radian on XZ axis plane at the current moment;
   extracting Y-axis data and Z-axis data from the corrected geomagnetic triaxial data, and performing arctangent function operation to calculate a rotation radian on YZ axis plane at the current moment.

8. The launching method according to claim 7, wherein the rotation radian of XY axis surface is calculated by using following formulas:

$XY_{azimuth}$ atan$(Y_{gain},X_{gain})*180/\pi+180$;

$Y_{gain}$ represents the weighted Y-axis data, $X_{gain}$ represents the weighted X-axis data, a result calculated from atan $(Y_{gain}, X_{gain})$ function is the rotation radian of the XY axis plane, $\pi$ represents Pi, and $XY_{azimuth}$ represents the rotation of the XY axis plane;
the rotation radian of XZ axis surface is calculated by using following formulas:

$XZ_{azimuth}$=a tan$(Z_{gain},X_{gain})*180/\pi+180$;

$Z_{gain}$ represents the weighted Z-axis data, $X_{gain}$ represents the weighted X-axis data, a result calculated from atan $(Z_{gain}, X_{gain})$ function is the rotation radian of the XZ axis plane, $\pi$ represents Pi, $XZ_{azimuth}$ represents the rotation radians on XZ axis plane;
the rotation radian of YZ axis surface is calculated by using the following formulas:

$ZY_{azimuth}$=a tan$(Y_{gain},Z_{gain})*180/\pi+180$;

$Y_{gain}$ represents the weighted Y-axis data, $Z_{gain}$ represents the weighted Z-axis data, a result calculated from atan $(Y_{gain}, Z_{gain})$ function is the rotation radian of on the YZ axis plane, $\pi$ represents the Pi, and $YZ_{azimuth}$ represents the rotation radians of the YZ axis plane.

9. The launching method according to claim 1, wherein the system data set is set to a two-dimensional array of 3*N;
wherein after storing the angle values in the pre established system data set, the launch method further comprises:
establishing a current index for the angle values;
when performing the iterative overlap on the angle values in the system data set, an index is zeroed and the current index is re-established for the angle values after the iterative overlap.

10. The launching method according to claim 1, wherein obtaining the updated system data set by using the Fourier transform algorithm on all of the angle values in the system data set comprises:
   S1, performing discrete Fourier transform on the angle values in the system data set according to following formulas to obtain discrete data in frequency domain:

$$X(k) = DFT[x(n)] = \sum_{n=0}^{N-1}x(n)e^{-j\frac{2\pi}{N}nk} = \sum_{n=0}^{N-1}x(n)W_N^{nk}$$

$0 \le k \le N-1$ wherein X(k) represents discrete data in frequency domain, DFT represents discrete Fourier transform, x(n) represents data corresponding to N position in the system data set, N represents data quantity of the system data set, e represents the base of natural logarithm, and WN represents the phase representation corresponding to the periodic function of w period $2\pi$;
   S2, processing the discrete data in frequency domain obtained in step S1 according to the following ternary operation formula:

$X_1(k)=(X(k)>fbase)?X(k-1):X(k)$

X(k) represents the discrete data in the frequency domain obtained in step S1, (base represents the preset frequency, and $X_1(k)$ represents the discrete data in the frequency domain after processing X(k);
   S3, performing inverse discrete Fourier transform on the discrete data in frequency domain obtained in step S2 according to the following formula, so as to obtain a dithered system data set:

$$X_1(n) = IDFT[x_1(k)] = \frac{1}{N}\sum_{k=0}^{N-1}X_1(k)e^{j\frac{2\pi}{N}nk} = \frac{1}{N}\sum_{k=0}^{N-1}X_1(k)W_N^{nk}$$

$0 \le n \le N-1$ $x_1(n)$ represents the data corresponding to the n position in the dithered system data set, IDFT represents the inverse discrete Fourier transform, $x_1(k)$ represents the discrete data in the frequency domain obtained in step S2, N represents the data quantity of the system data set, E represents the base of natural logarithm, and WN represents the phase representation corresponding to the periodic function with a period of $2\pi$ w;
   S4, covering the initial discrete data x(n) in the frequency domain with the discrete data $x_1(n)$ obtained in step S3.

11. The launching method according to claim 1, wherein if the angle difference value is greater than the preset angle value, before controlling the UAV dispenser to execute the launching action, the launch method further comprise:
   determining whether the angle difference value continues to increase or decrease within the preset time period;
   If yes, determining whether the angle difference is greater than the preset angle value.

12. The launching method according to claim 1, wherein before obtaining the geomagnetic triaxial data at the current time according to the preset heartbeat time, comprising:
   obtaining the heartbeat time according to following formula:

$T\text{tick} = T\text{Tok} * T\text{qmc}$

TTok represents communication time between a dispenser processor and triaxial magnetic sensor, while Tqmc represents a sampling period of the triaxial magnetic sensor; TTok≥2*Tqmc.

13. A launching device, comprising:
   an acquisition module for obtaining the geomagnetic triaxial data at a current moment at regular intervals according to the preset heartbeat time;
   a first calculation module for calculating a corrected geomagnetic triaxial data according to the geomagnetic triaxial data at the current moment;
   a second calculation module for calculating an angle value according to the corrected geomagnetic triaxial data and storing the angle value in a pre-established system data set;
   a module for obtaining an updated system data set by using a Fourier transform algorithm on all of the angle values in the system data set;
   a third calculation module for calculating an angle difference of the updated system data set accumulated in a preset time period;
   a launch module used for controlling the UAV dispenser to execute the launch action when the angle difference value is greater than a preset angle value.

14. A dispenser, comprising a memory, a processor, a triaxial geomagnetic sensor, a launching structure and a launching program stored in the memory and running on the processor;
   wherein the triaxial geomagnetic sensor is used for generating geomagnetic triaxial data;
   wherein the launching structure is used for executing launching action;
   wherein the launching program, when executed by the processor, implements the steps of geomagnetic-based launching method according to claim 1.

15. A computer-readable storage medium, wherein a launching program is stored on the computer-readable storage medium, and when the launching program is executed by a processor, the steps of the launching method according to claim 1 are implemented.

* * * * *